(12) United States Patent
De Carolis et al.

(10) Patent No.: US 11,408,450 B2
(45) Date of Patent: Aug. 9, 2022

(54) DEVICE AND METHOD FOR MONITORING RESPONSE TIME IN A VALVE MANIFOLD ASSEMBLY

(71) Applicant: Asco, L.P., Novi, MI (US)

(72) Inventors: Enrico De Carolis, Oakland Township, MI (US); Gregory A. Wells, Sr., Glendale, AZ (US); Mitch Frazier, Chandler, AZ (US)

(73) Assignee: ASCO, L.P., Novi, MI (US)

( * ) Notice: Subject to any disclaimer, the term of this patent is extended or adjusted under 35 U.S.C. 154(b) by 0 days.

(21) Appl. No.: 16/468,898

(22) PCT Filed: Sep. 18, 2017

(86) PCT No.: PCT/US2017/052039
§ 371 (c)(1),
(2) Date: Jun. 12, 2019

(87) PCT Pub. No.: WO2019/055046
PCT Pub. Date: Mar. 21, 2019

(65) Prior Publication Data
US 2020/0232484 A1 Jul. 23, 2020

(51) Int. Cl.
*F15B 19/00* (2006.01)

(52) U.S. Cl.
CPC .................... *F15B 19/005* (2013.01)

(58) Field of Classification Search
CPC .................................................. F15B 19/005
See application file for complete search history.

(56) References Cited

U.S. PATENT DOCUMENTS

| 4,542,649 A | 9/1985 | Charbonneau et al. |
| 5,329,956 A | 7/1994 | Marriott et al. |
| 5,524,484 A | 6/1996 | Sullivan |

(Continued)

FOREIGN PATENT DOCUMENTS

| CN | 101149002 A | 3/2008 |
| CN | 102914406 A | 2/2013 |

OTHER PUBLICATIONS

Chinese Office Action for Chinese Application No. 201780084745.2 dated Aug. 3, 2020 (7 pages).

(Continued)

*Primary Examiner* — Michael Leslie
*Assistant Examiner* — Matthew Wiblin
(74) *Attorney, Agent, or Firm* — Harness, Dickey & Pierce, P.L.C.

(57) ABSTRACT

A field bus solenoid valve assembly has a sensor for detecting the commencement of an actuation cycle for moving a piston in a cylinder and piston assembly. A position sensor detects an end position of a piston in a cylinder and piston assembly at the end of the actuation cycle. A timer times the elapsed time between the initiation of the actuation cycle of the piston and when the position sensor for detecting an end position detects the piston in its end position at the end of the actuation cycle. A comparator operably connected to a storage device and the sensors for comparing elapsed time from the sensors to a normalized time or profile and a predetermined tolerance boundary in the storage device. An alarm device is actuated if the elapsed time is outside of the set tolerance boundary.

6 Claims, 3 Drawing Sheets

(56) References Cited

U.S. PATENT DOCUMENTS

| | | |
|---|---|---|
| 6,073,650 A | 6/2000 | Garrigues et al. |
| 6,164,323 A | 12/2000 | Smith et al. |
| 6,386,229 B1 | 5/2002 | Morikawa et al. |
| 6,505,642 B2 | 1/2003 | Miyazoe et al. |
| 6,520,202 B2 | 2/2003 | Miyazoe et al. |
| 6,591,865 B2 | 7/2003 | Misumi |
| 6,612,332 B2 | 9/2003 | Miyazoe et al. |
| 6,675,830 B2 | 1/2004 | Doi et al. |
| 6,840,273 B2 | 1/2005 | Miyazoe et al. |
| 6,913,037 B2 | 7/2005 | Miyazoe et al. |
| 6,917,203 B1 | 7/2005 | Perotti et al. |
| 6,923,207 B2 | 8/2005 | Misumi |
| 7,357,019 B2 | 4/2008 | Mc Donald et al. |
| 7,432,721 B2 | 10/2008 | Rober |
| 7,516,656 B2 | 4/2009 | Nogami et al. |
| 7,890,216 B2 | 2/2011 | Boger et al. |
| 7,903,383 B2 | 3/2011 | Fukano et al. |
| 8,122,963 B2 | 2/2012 | Davis |
| 8,405,403 B2 | 3/2013 | Walker |
| 8,689,833 B2 | 4/2014 | Berner et al. |
| 8,812,914 B2 | 8/2014 | Jensen |
| 9,022,069 B2 | 5/2015 | Neff et al. |
| 9,128,008 B2 | 9/2015 | Tabor |
| 9,410,639 B2 | 8/2016 | Fukano et al. |
| 9,891,135 B2 * | 2/2018 | Aki ................ F15B 19/005 |
| 10,180,191 B2 | 1/2019 | Atkin et al. |
| 10,555,432 B2 | 2/2020 | De Carolis et al. |
| 2002/0035414 A1 | 5/2002 | Morikawa et al. |
| 2002/0092570 A1 | 7/2002 | Miyazoe et al. |
| 2003/0226594 A1 | 12/2003 | Miyazoe et al. |
| 2004/0051381 A1 | 3/2004 | Garner et al. |
| 2005/0072954 A1 | 4/2005 | Nielsen |
| 2007/0034264 A1 | 2/2007 | Kunz et al. |
| 2008/0072657 A1 | 3/2008 | Herbert et al. |
| 2010/0043894 A1 | 2/2010 | Moriya et al. |
| 2010/0043896 A1 | 2/2010 | Shock et al. |
| 2014/0174556 A1 | 6/2014 | Herbert et al. |
| 2014/0299799 A1 | 10/2014 | Fukano et al. |
| 2015/0083260 A1 | 3/2015 | Morikawa et al. |
| 2015/0285281 A1 | 10/2015 | Gehrke et al. |
| 2015/0378370 A1 | 12/2015 | Maichl et al. |
| 2016/0131164 A1 * | 5/2016 | Carpenter ........... F15B 19/005 92/5 R |
| 2018/0245608 A1 | 8/2018 | Doll et al. |
| 2019/0145437 A1 * | 5/2019 | Fujiwara ............ F15B 19/005 60/328 |

OTHER PUBLICATIONS

English Translation of Chinese Office Action for Chinese Application No. 201780084745.2 dated Aug. 3, 2020 (7 pages).

* cited by examiner

DEVICE AND METHOD FOR MONITORING RESPONSE TIME IN A VALVE MANIFOLD ASSEMBLY

TECHNICAL FIELD

This invention relates to a valve manifold control system and more particularly to a system for monitoring performance response time for the control valve in the valve manifold and it's respective field device.

BACKGROUND OF THE DISCLOSURE

Field bus systems incorporating a manifold assembly are commonly used in an industrial line to selectively direct pneumatic pressure to various pneumatically operated field devices. The manifold assembly is commonly modular and is assembled from a plurality of individual fieldbus modules including I/O modules, a communication module, and manifold members. The manifold member includes a manifold block that mounts one or more individual control valves, often referred to as solenoid valves, valve blocks or merely valve members that control the direction of pneumatic flow for operating respective field devices. The manifold member often has a common pilot pressure passage and main pressure passage that are connected to the solenoid valves which in turn control the flow of main pressure to a respective pneumatically operated field device. The field device is often operated by a piston and cylinder assembly that cycles from a retracted position to an extended position and vice versa. As used herein, a motion cycle is from the retracted to extended position or from extended position to the retracted position.

These manifold assemblies have the capacity to incorporate many manifold blocks, and valve stations which in turn operate many field devices in a large manufacturing or industrial line. As each control valve needs to be correctly operating to maintain correct operation of the respective field device. Failure of a single control valve and its respective pneumatically operated field device may cause an entire manufacturing or industrial line to cease operating.

It is preferable to maintain each field device and its control valve and connecting tubing in operating condition and to replace any component before its failure during scheduled maintenance and normal down time to prevent unscheduled cessation of the line. However, monitoring of only the control valve is limited. Monitoring of only the control valve does not provide any information about of any problems downstream i.e.

at the pneumatic tubing leading to the field device or within the field device itself. Hence it is highly desirous and advantageous to also monitor the performance time i.e. the response time of a piston and cylinder assembly from the time of the initiation of the cycle to the end of the cycle which then can tell if any problems may be occurring at the field device or at any point upstream thereof to the control valve. A partial list of various parameters that can affect performance are pinched or disconnected tubing, leaks for example in either in the valve, cylinder, fittings or tubing, a manual change or tampering of the flow control, a manual change or tampering in the pressure regulator, changes in load, binding of the cylinder caused by wear or rod side loading or valve wear, cylinder wear or sensor malfunction.

Previous monitoring parameters for monitoring field devices have been previously sent to the field bus PLC. In order for an operator on the floor to see any warnings from the PLC, the PLC needs to send an indicator signal to the main control unit of the bank which then needs to send the indicator signal to the appropriate I/O unit. This receiving and re-sending the indicator signals to the PLC and through the main control unit and to the I/O unit is unnecessarily complicated.

What is desired is to provide an expeditiously constructed warning system that provides a timing function from actuation of the valve at the field bus to the final cycle position of the field device, for example the cycle time it takes for a piston cylinder to move from a retracted position to an extended position and vice versa and where the elapsed time signal is then sent directly to the I/O module in the field bus for the respective manifold control valve in the manifold bank. What is also desired is to have a fieldbus system with intelligence and memory to compare the elapsed time signal value with predetermined acceptable elapsed time value and to provide a warning or other indication at the fieldbus modules if an unacceptable variance in the elapsed time valve has occurred compared to the predetermined acceptable elapsed time value. What is also desired is to have the above-mentioned advantage of a monitoring system by using hardware that is already installed and/or readily available.

SUMMARY OF THE DISCLOSURE

According to one aspect of the invention, a field bus solenoid valve assembly has at least one electronic communication module that has at least one input/output connector either integral or connected thereto via an I/O module. The communication module is connected to at least one manifold member having a valve body with a solenoid operated control valve mounted and operated by a solenoid. A manifold member has first and second flow paths for supplying and discharging pressurized fluid to and from ports of the at least one valve body. The supplying and discharging of pressurized fluid within the first and second flow paths depend on the position of the solenoid operated control valve.

A piston and cylinder assembly has a piston slidably movable within a cylinder between a retracted end and extended end of the cylinder. The piston and cylinder assembly is connected to the first and second flow paths at the retracted and extended ends for shuttling the piston within the cylinder between the retracted and extended end positions. A first position sensor is housed in proximity to one end of the cylinder for sensing when the piston is in its extended or retracted end position. A detection sensor detects the commencement of an actuation cycle for moving a piston in the piston and cylinder assembly.

A timer device times the elapsed time between the initiation of the cycle of the piston and when the position sensor for detecting an end position detects the piston in its end position at the end of the cycle. A storage device is operably connected to the position sensor and detection sensor for receiving and storing normalized cycle time profiles and storing a predetermined tolerance boundary from the normalized cycle time profiles. A comparator is operably connected to the storage device, the position sensor and detection sensor for comparing time parameters initiated and ended by the detection sensor and the position sensor with the normalized cycle profile and the predetermined tolerance boundary. An alarm is connected to the comparator and is actuated if the comparator compares the elapsed time with the normalized profile and the predetermined tolerance boundary and determines that the elapsed time is outside of the predetermined tolerance boundary.

Preferably, the detection sensor and the position sensor are electrically connected to separate I/Os in an I/O module that is connected to the communication module. In one embodiment, the position sensor is a linear potentiometer that measures analog voltage depending on the linear position of the piston within the cylinder for measuring acceleration and deceleration.

In one embodiment, the detection sensor is a second position sensor mounted on the other end of the cylinder housing from the first position sensor. In one embodiment, a second position sensor is mounted on the other end of the cylinder housing such that cycle times for both extending the piston rod and retracting the piston rod can be measured.

According to another aspect of the invention, an I/O module is connected to a communication module which is connected to a manifold member. The manifold member has a control valve mounted thereto that is and operated by a solenoid between a first and second position. The communication module, at least one I/O module and the solenoid are electrically connected together to an actuation circuit that actuates the control valve. A manifold member has first and second flow paths for supplying and discharging pressurized fluid to and from ports of the at least one valve body, the supplying and discharging of pressurized fluid within the first and second flow paths depend on the position of the control valve. A piston cylinder assembly has a cylinder with first end and a second end and a piston that is slidably movable within the cylinder between first and second end positions. The piston cylinder assembly is connected to the first and second flow paths at its first and second ends to receive pressurized fluid and thereby reciprocally moving the piston within the cylinder between the first and second end positions. A first position sensor and a second position sensor are housed in proximity to the respective first and second ends for sensing when the piston is in its first or second end position.

A timer device is connected to the sensors for timing the elapsed time from the initiation of an actuation cycle that moves the piston from its initial position to the arrival of the piston at the other end position as sensed by the first or second position sensor. A storage device is also operably connected to the position sensors and the actuation circuit for receiving and storing normalized cycle time profiles and storing a predetermined tolerance boundary from the normalized cycle time profiles. A comparator is operably connected to the storage device, the actuation circuit, and the first and second position sensors for comparing time parameters initiated by the actuation circuit and ended by the position sensors with the normalized cycle profile and the predetermined tolerance boundary. An alarm is actuated if the comparator determines the time parameter i.e. elapsed time is outside the preset tolerance boundary. The time device, storage device, comparator and alarm can be housed in the communication module or an I/O module that is connected to the communication module.

In one embodiment, a detection sensor detects the commencement of the actuation cycle for moving a piston in a piston and cylinder assembly from the initiation of a signal to the solenoid that moves the control valve to move from its first position to its second position or from its second position to its first position. The timer device times the elapsed time from the beginning of a signal to the solenoid that moves the control valve to the arrival of the piston at the second end position as sensed by the second position sensor or to the arrival of the piston at the first end as sensed by the first position sensor. The comparator is operably connected to the storage device, the actuation circuit, and the first and second position sensors for comparing time parameters initiated by the actuation circuit and ended by the signal from the position sensors with the normalized cycle profile and the predetermined tolerance boundary.

According to another aspect of the invention, a detection system for a field bus solenoid valve assembly has a sensor for detecting the commencement of an actuation cycle for moving a piston in a piston and cylinder assembly. A position sensor detects an end position of a piston in a cylinder and piston assembly at the end of the cycle. A timer measures the elapsed time between the initiation of the cycle of the piston and when the position sensor detects the piston in its end position at the end of the cycle. A storage device is operably connected to the sensors to receive parameter data for an established normalized cycle profile and storing a predetermined tolerance boundary. A comparator is operably connected to the storage device and the sensors for comparing elapsed time from the sensors to the normalized cycle profile and the predetermined tolerance boundary. An alarm device is operably connected to the comparator and is actuated if the comparator compares a parameter from a sensor with the normalized profile and the predetermined tolerance boundary and finds the parameter is outside of the predetermined tolerance boundary.

BRIEF DESCRIPTION OF THE DRAWINGS

Reference now is made to the accompanying drawings in which.

DETAILED DESCRIPTION OF THE PREFERRED EMBODIMENT

Figure 1:
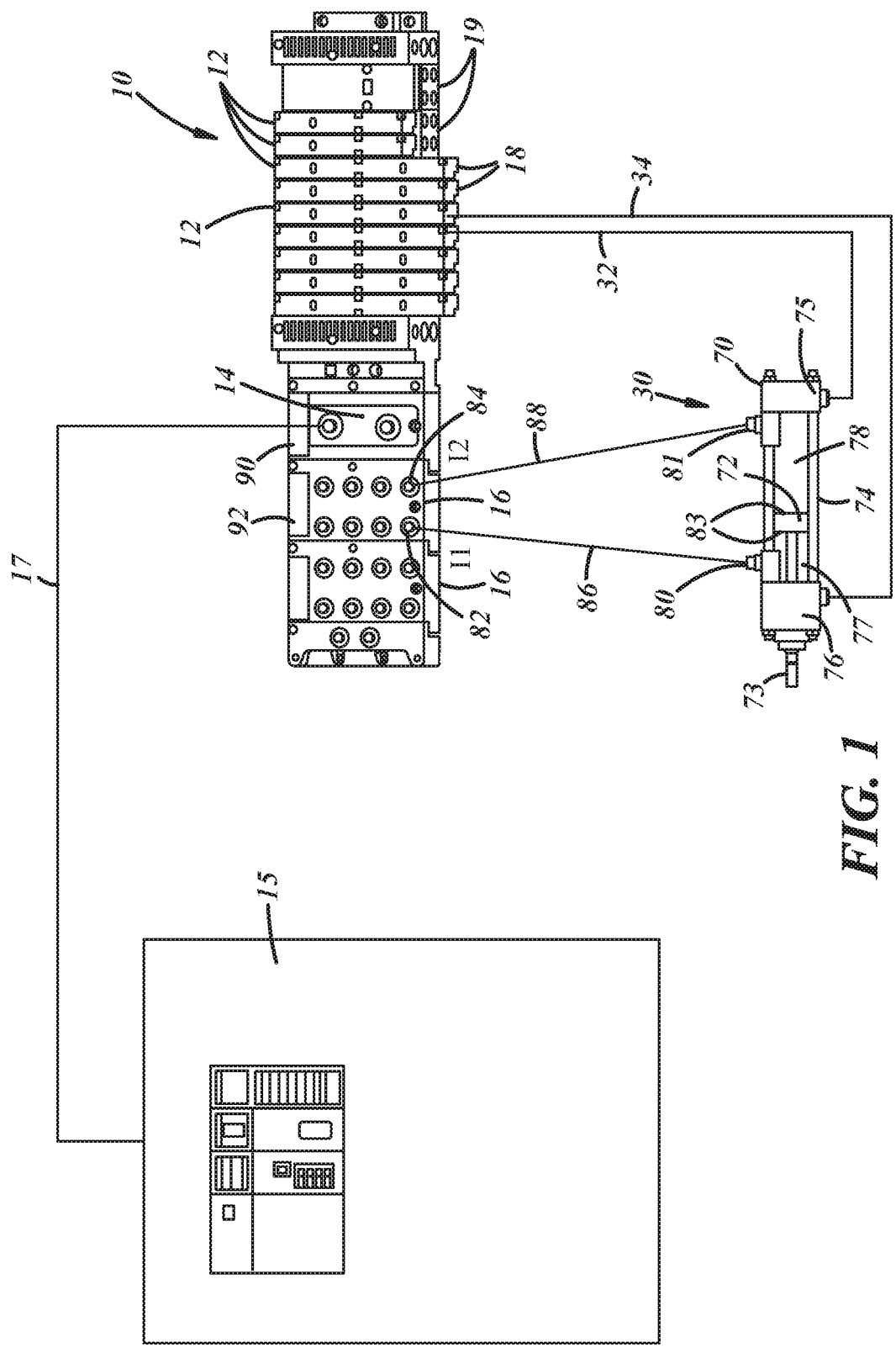
FIG. 1 is a perspective and partially schematic overview of one embodiment according to the invention.

Referring now to FIG. 1, a fluid control system 10 is modular in nature and has a plurality of valve manifold members also referred to as manifold units 12 interconnected together with a communication module 14 and a series of I/O modules 16. The communication module 14 may be connected to a field bus network 17 controlled by a Programmable Logic Computer (PLC) and communication card 15. The particular number of manifold units 12 is dependent on the application and the capacity of the circuitry installed in each unit 12. Each manifold unit 12 includes a manifold block 19 which may mount one or two control valves 18 on its upper surface 13.

Figure 2:
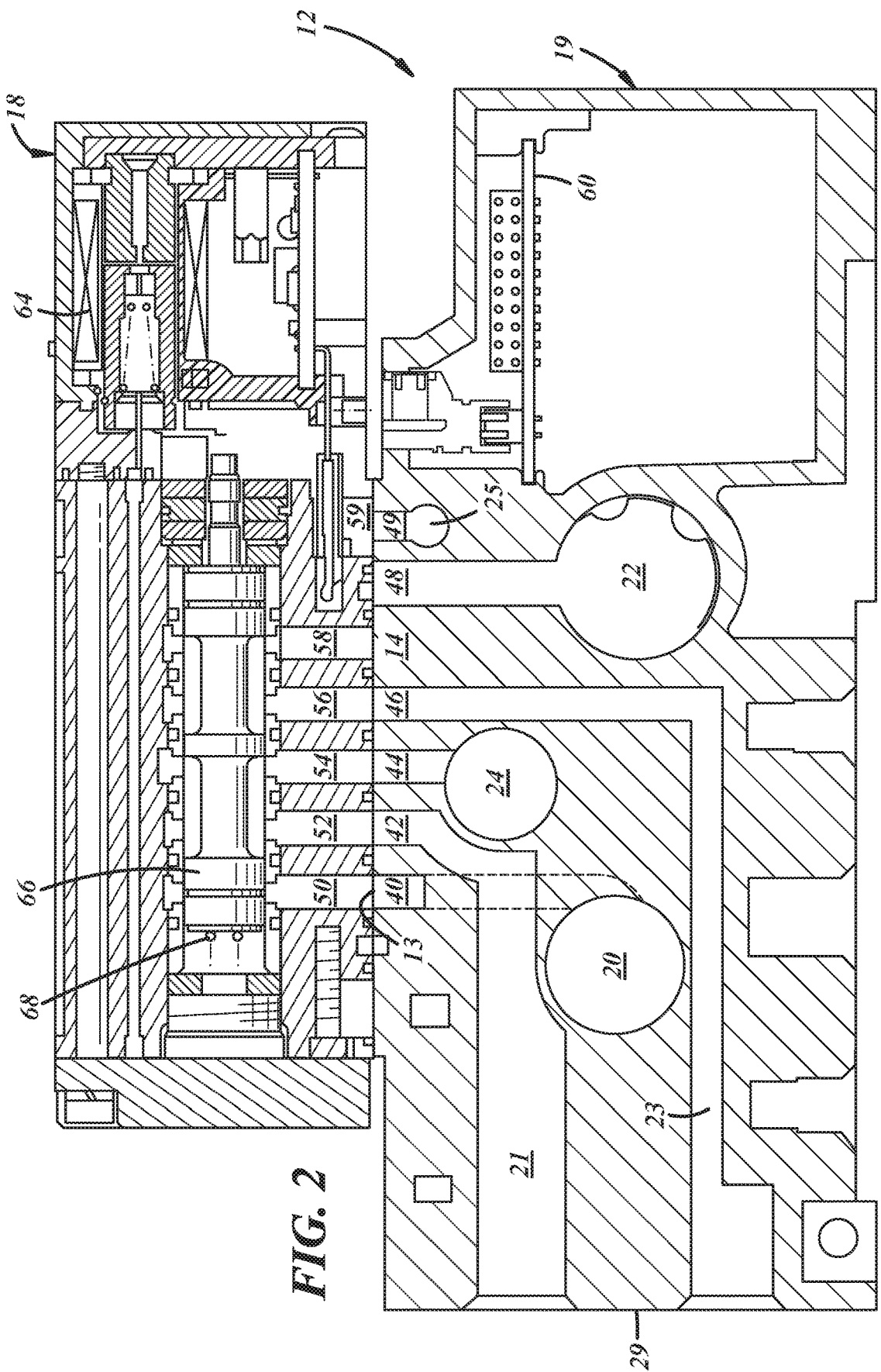
FIG. 2 is a cross sectional view of the valve housing and manifold block shown in FIG. 1.
Figure 3:
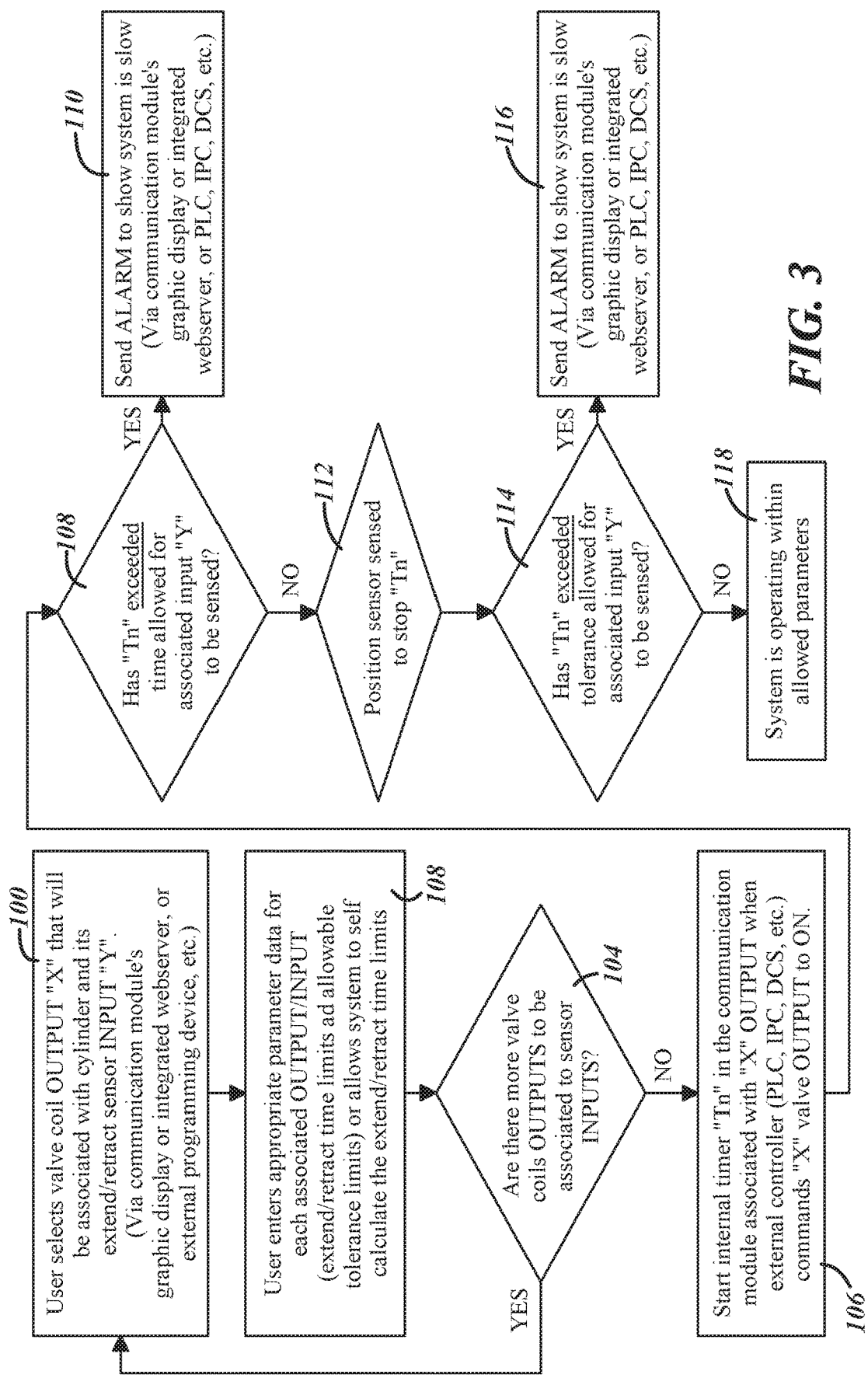
FIG. 3 is a schematic flow chart illustration typical operation of one embodiment of the invention.

Referring to FIGS. 2 and 3, each manifold block 19 has fluid supply and fluid exhaust passages 20, 22, and 24 that extend laterally through the block to be in communication with an adjacent block 19. Each manifold block also has discharge passages 21 and 23 that extend to an outer wall 29 for connecting to a pneumatically operated field device 30 through two pneumatic conduits 32 and 34 as showing in FIG. 3. Each manifold block also has a transverse pilot pressure passage 25. Each passage 20, 21, 22, 23, 24, and 25 connects to a respective port 40, 42, 44, 46, 48 and 49 at the upper surface 13 of the manifold block 19 which are in communication with respective ports 50, 52, 54, 56, 58, and 59 in valve 18.

A circuit board 60 is mounted in the manifold block 19 in known fashion and supplies electric power to the solenoid valve coil 64 of the control valve for actuating the solenoid valve 18 and moving its spool 66 through the force pneumatic pressure from port 59 that is over the prior pressure. When the spool 66 axially moves, it controls the communication between the ports 50-58, i.e. the opening and closing of ports 50-58. In a well-known fashion, the spool 66 may be biased to one direction by a spring 68. Although the embodiment shown is a single solenoid valve assembly, it will be understood that commercially available dual solenoid valve assemblies may also be used. Briefly is a dual solenoid valve, the return springs 68 is eliminated and a second solenoid is operated to provide fluid pressure to return the spool 66 (to the right as shown in FIG. 2).

The field device 30 is commonly operated by a piston and cylinder assembly 70 which has a piston 72 connected to a piston rod 73 that extends out of one end 76 of cylinder 74. The piston 72 is slidably housed within the cylinder housing 74 between a retracted position (to the right in FIG. 1) and an extended position (to the left in FIG. 1). The pneumatic conduits 32 and 34 are connected to opposite ends 75 and 76 and in communication to opposite internal pressure chambers 77 and 78 to provide flued pressure to either chamber 77 and 78 for cycling the piston 72 back and forth within the cylinder housing 74 to either retract or extend the piston rod 73.

Two position sensors 80 and 81 are mounted on cylinder housing 74. These position sensors 80 and 81 may be Hall effect sensors. The piston 72 may have a magnet 83 mounted thereon which when in proximity to either sensor 80 or 81 triggers the sensor to send an output signal.

The position sensors 80 and 81 are each electrically connected to a separate input 82 and 84 of the respective I/O unit 16 corresponding to the valve 18 that is pneumatically connected to the field device 30. The connection is through two electrically conductive cables 86 and 88. Wireless communication is also foreseen as a possibility Reference is now made to FIG. 3 to describe the general operation of the disclosed embodiment. Referring to box 100, an operator (user) selects the appropriate valve coil 64 that operates the respective field device 30 and then enters appropriate time and other parameter data for each I/O 16 associated with the valve coil 18 as indicated in box 102. The steps are repeated as set forth in box 104 until all output parameters are determined. After all appropriate outputs are set, the cycle operation is commenced. As used herein, a cycle commences when the main communication module 14 sends a signal (by providing an operating voltage or ending the operating voltage) to either actuate or de-actuate a solenoid coil 64 of the valve 18. The signal in effect commences the cycle to move the piston 72 from its present end position (either retracted or extended) to the other end position (either extended or retracted). When the cycle is commenced, a detection sensor senses the change in voltage in the actuation circuit line and an internal timer Tn in the main communication module 14 is started as illustrated in box 106. The acceptable limits and tolerances have already been set in the first step in box 100 and stored in an internal storage in the main communication module.

If the timer does not shut down due to some defect, the time "Tn" will exceed the time allowed for the associated input Y (either input 82 or 84) as indicated in box 108 and an alarm is sent. The alarm can be visual indication on the graphic display 92 of the I/O unit module 16 or the display 90 of the communication module 74. The alarm can also be sent to an integrated webserver or the PLC 15 or an IPC and DCS etc.) as illustrated in box 110. Audio as well as visual alarms are foreseen.

When the piston 72 moves to the other end, one of the positions sensors 80 and 81 will sense when the piston reaches the end position and a signal is sent via either cable 86 or 88 to input 82 or 84 which turns off the timer and provides the final time Tn as shown in box 112. A comparator then compares Tn and determines if it within tolerances previously set for the valve as illustrated in box 114. If the tolerances are exceeded, an alarm is sent from the I/O unit to the communication module and displayed on either graphic display, 90 or 92 an integrated webserver or the PLC 15 or an IPC and DCS etc.) as illustrated in box 116. It should be noted that the tolerances can also be set for being too short. Overly fast times may occur if someone manually increased the pressure in main line beyond the desired pressure, lowered the load on the field device or other changes that can cause faster than proper times.

If the final time Tn is within parameters, the system continues and the program is reset for the next cycle as illustrated in box 118.

Other parameters may be substituted such as spool motion or flow rate in place of or in addition to the position and time parameters. The choice of parameters may be selected depending on the specific application of the control valve.

When a control valve or its accompanying field device 30 shows some degradation before a complete failure, an audio alarm or visual notification is provided which allows the control valve or field device 30 to be repaired or replaced at the next down time or scheduled maintenance before complete failure occurs which can then avoid unscheduled and unnecessary line stoppage.

An alternate embodiment is foreseen where the signal from the Hall effect sensor also initiates the timer rather the timer being initiated by the beginning of the cycle.

It is also foreseen that the dual solenoid valves can be used with this monitoring and timing system. When dual solenoid valves are used, the respective cycle is commenced when an actuating voltage is sent to a respective first or second solenoid for the valve. The cessation of the actuating voltage is ignored for setting the next cycle. The next cycle is commenced when an actuating voltage is sent to the other of the first or second solenoid.

It is also foreseen that one of the position sensors may be a linear potentiometer that measures analog voltage depending on the linear position of the piston within the cylinder for determining acceleration and deceleration using the position of the piston and elapsed time.

In this fashion, by having the signal that initiates the cycle also turning on the timer and timing the cycle from the moment a signal is initiated until the piston achieves its end position achieves a improved level of prognostics or preventative maintenance. Not only the valve is monitored, but also the pneumatic tubing 32 and 34, and any binding or problems with the cylinder and piston or other binding parts of the field device connected to the piston rod 73 can be detected. The cycle is monitored from its initiation to its end. The parameters that can affect the cycle time include leaks in the valve cylinder fitting and tubing for example; the manual change in the flow control, manual change in a pressure regulator, changes in load, binding in the cylinder and piston assembly caused by wear or rod side loading, valve wear, cylinder wear, weak return spring in the solenoid valve, sensor malfunction, input module malfunction and other changes or malfunctions.

The timing of the cycle commencing with the actuating voltage change sent to the coil and ending with the piston reaching its end can be used to monitor the function and if any changes over time and deviations from the set forth proper time is sensed, an appropriate alarm can be sent to provide warning that something in the line from the coil and valve to the field device is not operating up to design and set standards.

Other variations and modifications are possible without departing from the scope and spirit of the present invention as defined by the appended claims.

The invention claimed is:

1. A fluid control system comprising:
a controller;
a fieldbus communication module controlled by the controller and connected to the controller via a fieldbus network;
at least one manifold unit connected to the fieldbus communication module, the manifold unit including at least one solenoid control valve for controlling flow of a fluid;
at least one fieldbus I/O module connected to the fieldbus communication module; and
a field device pneumatically connected to the manifold unit, the field device including a piston and sensors for determining when the piston is in its extended or retracted position, the sensors electrically connected to the fieldbus I/O module;
the fieldbus communication module configured to process signals received from the controller and, in response, send signals to the solenoid control valve to control flow of the fluid to the field device;
wherein the fieldbus communication module is further configured to process the signals received from the controller and signals received from the field device sensors via the fieldbus I/O module to determine the elapsed time between an initiation and completion of an actuation cycle of the piston and to actuate an alarm if the elapsed time is outside of a predetermined tolerance boundary.

2. The system of claim 1 wherein the fieldbus communication module includes a display for displaying the alarm.

3. The system of claim 1 wherein the controller is a Programmable Logic Computer (PLC) and the fieldbus communication module is configured to send the alarm to the PLC.

4. The system of claim 1 wherein the alarm is an audio alarm.

5. A fluid control system comprising:
a controller;
a fieldbus communication module controlled by the controller and connected to the controller via a fieldbus network;
at least one manifold unit connected to the fieldbus communication module, the manifold unit including at least one solenoid control valve for controlling flow of a fluid;
at least one fieldbus I/O module connected to the fieldbus communication module; and
a field device pneumatically connected to the manifold unit, the field device including a piston and sensors for determining when the piston is in its extended or retracted position, the sensors electrically connected to the fieldbus I/O module;
the fieldbus communication module configured to process signals received from the controller and, in response, send signals to the solenoid control valve to control flow of the fluid to the field device;
wherein the fieldbus communication module is further configured to process the signals received from the controller and signals received from the field device sensors via the fieldbus I/O module to determine the elapsed time between an initiation and completion of an actuation cycle of the piston and to actuate an alarm if the elapsed time is outside of a predetermined tolerance boundary; and
wherein the fieldbus I/O module includes a display for displaying the alarm.

6. A fluid control system comprising:
a controller;
a fieldbus communication module controlled by the controller and connected to the controller via a fieldbus network;
at least one manifold unit connected to the fieldbus communication module, the manifold unit including at least one solenoid control valve for controlling flow of a fluid;
at least one fieldbus I/O module connected to the fieldbus communication module; and
a field device pneumatically connected to the manifold unit, the field device including a piston and sensors for determining when the piston is in its extended or retracted position, the sensors electrically connected to the fieldbus I/O module;
the fieldbus communication module configured to process signals received from the controller and, in response, send signals to the solenoid control valve to control flow of the fluid to the field device;
wherein the fieldbus communication module is further configured to process the signals received from the controller and signals received from the field device sensors via the fieldbus I/O module to determine the elapsed time between an initiation and completion of an actuation cycle of the piston and to actuate an alarm if the elapsed time is outside of a predetermined tolerance boundary; and
wherein the sensors are electrically connected to separate I/Os of the fieldbus I/O module.

* * * * *